July 16, 1929.  W. H. TOWNE  1,720,704
HOPPER OR PIT
Filed Aug. 30, 1927

INVENTOR
Willis H. Towne,
BY
*Philip E. Singer*
ATTORNEY

Patented July 16, 1929.

1,720,704

UNITED STATES PATENT OFFICE.

WILLIS H. TOWNE, OF EVANSTON, ILLINOIS, ASSIGNOR TO GIFFORD-WOOD COMPANY, OF HUDSON, NEW YORK, A CORPORATION OF NEW YORK.

HOPPER OR PIT.

Application filed August 30, 1927. Serial No. 216,440.

This invention relates to hoppers or pits for handling coal and other fluent materials, and among other objects, aims to provide a hopper or pit whose construction is such as to obviate stoppage of gravity flow of the materials due to various causes.

In the accompanying drawings illustrating a preferred embodiment of the invention:

Figure 1:
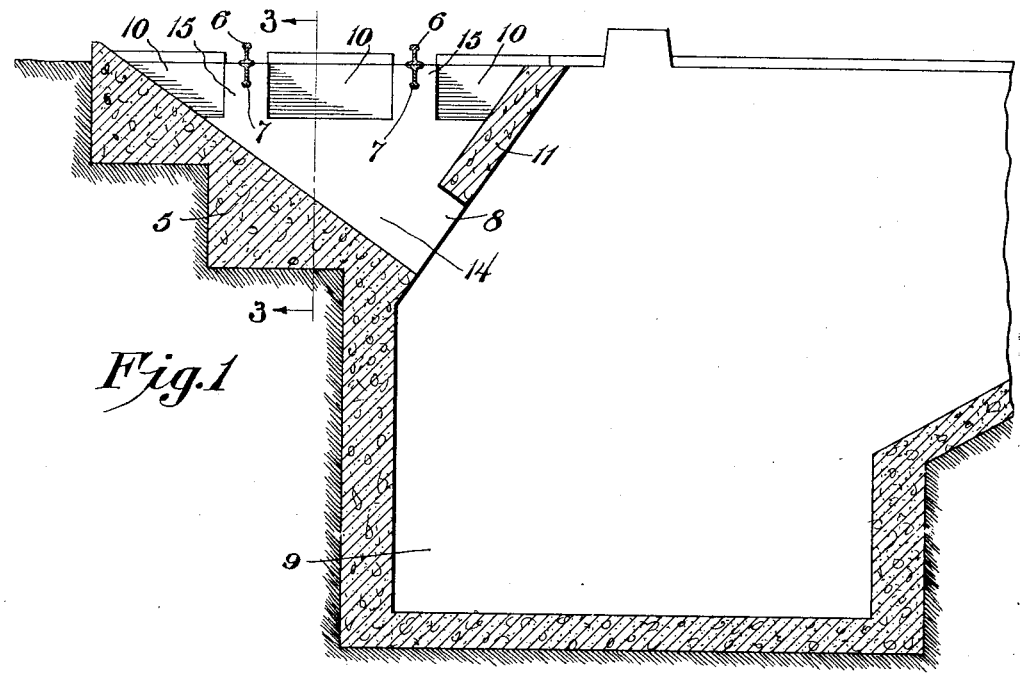
Fig. 1 is a sectional elevation of a hopper or pit constructed and arranged for use with a trolley bucket conveyor (not shown)

Modern plants for handling coal, gravel, sand and similar fluent materials are usually supplied by freight cars which are run on the plant siding and dump their contents into a hopper or pit below the track, a conveyor of some sort being used to convey the dumped material to a silo or some part of the yard for storage until sold at retail. Such plants may handle vast quantities of material with only one or two operators, who need not be highly skilled, and are rapidly coming into use because of the economies realized. However, at times certain operating difficulties arise, one of which is a choking of the passage through the hopper or pit, usually because of the bridging effect of large lumps of the material actuated by opposed or partially opposed pressures due to the flow of the material from several different directions toward the discharge point. The present invention aims to obviate the described operating difficulty.

Referring more specifically to the drawings, there is shown a hopper or pit, the receiving portion 5 of which is located directly beneath a railroad siding whose rails 6 bridge the space over the hopper or pit, being supported for example by inverted rails 7 whose ends are embedded in the masonry forming the walls of the hopper or pit. Said walls provide a series of converging surfaces leading to a channel or chute at the lower end of which is an opening 8 controlled by a gate (not shown) such as is described and claimed in the Root application Serial No. 78,163. Said gate controls the flow of the material to a bucket (not shown) which descends into the lower part 9 of the pit for a load.

Figure 2:
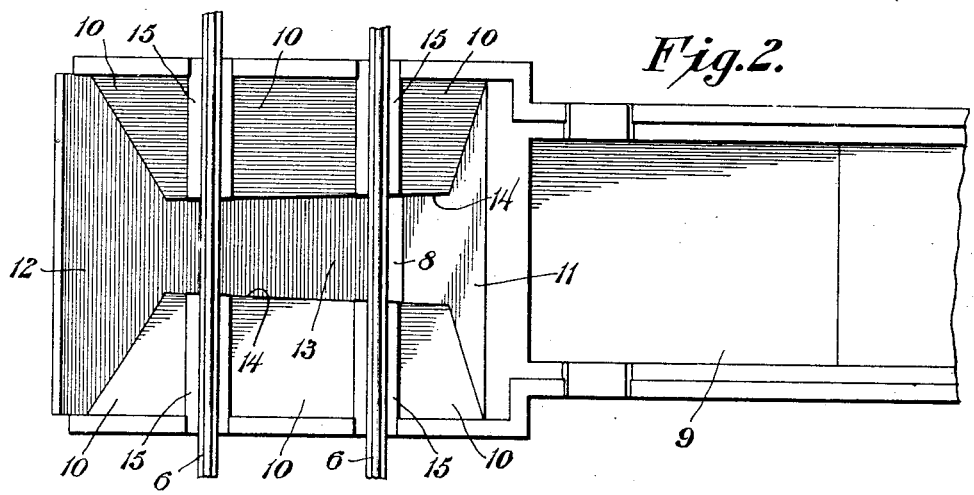
Fig. 2 is a plan view of the same.
Figure 3:
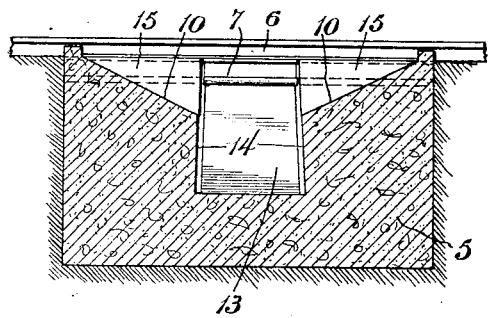
Fig. 3 is a section on line 3—3 of Fig. 1.

To deliver the material to the discharge end of the hopper without choking, some of the walls of the hopper are arranged and built so as to support a considerable part of the weight of the material, with but a relatively small gravitational component urging downward flow of the material. As shown, there are two such walls 10 whose supporting surfaces are inclined in opposite directions at an angle of about 25° to the horizontal, extending generally longitudinally of the track. If the hopper has four walls, as is customary, the walls 10 are bounded at their opposite ends by front and rear walls 11, 12, respectively, the front wall being more nearly vertical than any of the others to reduce the load thereon, but sloping inwardly relative to the hopper, and having the opening 8 therein. The rear wall 12 preferably has a slope of about 45° and merges into the bottom of a chute or channel 13 the sides of which are formed by walls 14 dropping below the inclined planes 10. To prevent choking, the area of the chute or channel 13 increases as the opening 8 is approached. While this could be accomplished in other ways, in the illustrative embodiment the side walls 14 of the chute or channel diverge or separate laterally, as shown in Fig. 2, and also diverge downwardly, as shown in Fig. 3, and because of the greater inclination of the bottom of the chute as compared with the slope of planes 10, the depth of the chute or channel constantly increases as the opening 8 is approached, as will be understood from Fig. 1. The result is that no arching or bridging of lumpy material takes place, and the flow is even and uniform, without choking or stoppage of flow.

To provide an adequate foundation for the rails 6, which must support a heavily loaded railroad car, there are four vertical walls 15 within the hopper rising above the inclined planes 10 to the level of the top of the hopper, and having imbedded therein the inverted rails 7. Any suitable means are used to connect the rails 6 rigidly with their support 7. The walls 15 are of minimum thickness so as not to interfere with the flow of the material, and terminate preferably at the walls 14 bounding the chute or channel.

Obviously the invention is not limited to the particular embodiment herein shown and described.

What is claimed is:—

1. A hopper for handling coal and similar fluent materials comprising, in combination, a front wall having a opening; an inclined wall leading directly to said opening from the opposite side of the hopper and having an angle of inclination greater than the angle of repose of the materials to be handled, so that such materials when supported by said inclined wall gravitate to the opening; said walls and the other walls of the hopper providing a channel through which the materials may flow without choking; the cross-section of said channel increasing in area as the opening is approached.

2. A hopper for handling coal and similar fluent materials comprising, in combination, two oppositely inclined walls, one of which is pierced by an opening at its bottom, the other of which leads directly to said opening; said walls and the other walls of the hopper providing a channel through which the materials may flow without choking; the cross-section of said channel increasing in area as the opening is approached.

3. A hopper for handling coal and similar fluent materials comprising, in combination, a plurality of side walls, one having an opening at its lowest point, said walls providing a channel leading to said opening, the cross-section of said channel increasing as the opening is approached, whereby the coal may flow through the channel without choking.

4. A hopper for handling coal and similar fluent materials comprising, in combination, a front wall having an opening; an inclined wall leading directly to said opening from the opposite side of the hopper and having an angle of inclination greater than the angle of repose of the materials to be handled, so that such materials when supported by said inclined wall gravitate to the opening; the other walls each having a relatively small angle of inclination, so that the weight of the materials on said walls is largely carried by them, with but a small gravitational component urging said materials to move toward the center of the hopper.

5. A hopper for handling coal and similar fluent materials comprising, in combination, a front wall having an opening; an inclined wall leading directly to said opening from the opposite side of the hopper and having an angle of inclination greater than the angle of repose of the materials to be handled, so that such materials when supported by said inclined wall gravitate to the opening; the other walls each having a relatively small angle of inclination, so that the weight of the materials on said walls is largely carried by them, with but a small gravitational component urging said materials to move toward the center of the hopper; the hopper walls providing a channel through which the materials may flow without choking; the cross-section of said channel increasing in area as the opening is approached.

6. A hopper for handling coal and similar fluent materials comprising, in combination, a plurality of walls converging downwardly and all leading to a channel terminating at a discharge opening at a low point thereof; said channel having side walls which diverge as the opening is approached, whereby the coal may flow through the channel without choking.

7. A hopper for handling coal and similar fluent materials comprising, in combination, a plurality of walls converging downwardly and all leading to a channel terminating at a discharge opening at a low point thereof; said channel having side walls which diverge as the opening is approached; the bottom of the channel being provided by a wall whose inclination is greater than the angle of repose of any of the materials to be handled.

8. A hopper for handling coal and similar fluent materials comprising, in combination, a four-walled receptacle having a discharge opening at a low point and a channel open at the top and leading to said discharge opening; inclined side walls forming a part of said receptacle and leading to said channel; upstanding walls extending transversely of the receptacle and rising interiorly to the top of the receptacle, and spaced apart about the distance of standard gauge railroad track; said transverse walls supporting rails which bridge the channel, so that a bottom dumping railroad car may discharge by gravity directly into the hopper; said walls terminating at each side of the channel so as not to interfere with the flow of material therethrough.

9. A hopper for handling coal or similar fluent material, comprising, in combination, a receptacle having a plurality of side walls and having a discharge opening at its lowest point and having a channel leading downwardly to said opening; said channel being open at the top, and being wider at the bottom than at the top, whereby the coal may flow through the channel without choking.

10. A hopper comprising, in combination, a plurality of side walls extending downwardly and having a discharge opening; and a channel leading to said opening; said channel being open at the top, but wider at the bottom than at the top; said channel also widening laterally as the opening is approached, whereby the coal may flow through the channel without choking.

In testimony that I claim the foregoing as my own, I have hereto affixed my signature.

WILLIS H. TOWNE.